United States Patent

[11] 3,576,451

| [72] | Inventor | Elliott W. Markow |
| | | Burlington, Mass. |
| [21] | Appl. No. | 834,681 |
| [22] | Filed | June 19, 1969 |
| [45] | Patented | Apr. 27, 1971 |
| [73] | Assignee | Newton Electronic Systems, Inc. |
| | | Waltham, Mass. |

[54] VIDEO DETECTION CIRCUIT
21 Claims, 4 Drawing Figs.

[52] U.S. Cl.................................................. 307/268,
307/235, 307/237, 328/117, 328/150, 328/164,
328/187, 330/86, 330/145
[51] Int. Cl..................................................... H03k 5/00
[50] Field of Search........................................... 307/235,
237, 268; 328/115.7, 185, 163, 164, 167, 187,
151; 330/86, 143

[56] References Cited
UNITED STATES PATENTS

| 3,292,013 | 12/1966 | Golahny...................... | 307/235X |
| 3,452,290 | 6/1969 | Huntley...................... | 330/86X |
| 3,500,073 | 3/1970 | Salaman...................... | 307/235X |

*Primary Examiner*—Donald D. Forrer
*Assistant Examiner*—John Zazworsky
*Attorney*—Rich and Ericson ABSTRACT: A detection circuit for a photoelectrical transducer such as a vidicon tube comprising a dual channel amplifier having automatic gain control for relatively low frequencies and a high pass channel for signal transitions and further comprising a summing circuit for combining signals from the gain control circuit and the high pass circuit, and a level detector connected to the summing circuit.

INVENTOR.
ELLIOTT W. MARKOW

VIDEO DETECTION CIRCUIT

My invention relates to photoelectrical transducers, and particularly to a novel circuit for conditioning a signal produced by a photoelectrical transducer so that it can be demodulated by a level detector.

In approaching the limits of resolution of photoelectrical transducers such as iconoscopes, orthocons, vidicons, flying spot scanner, and the like, the problem is encountered that relatively widely spaced transitions in the optical pattern scanned tend to produce entirely different signal levels than relatively closely spaced transitions. For example, in the use of a vidicon tube for recording hard copy, for use in facsimile for graphic data transmission, for example, closely spaced thin black lines on a white ground, or closely spaced with white lines on a black ground, obviously can not be made to produce maximum signal amplitudes in response to the transitions from black to white, or vice verse, as great as those signal amplitudes that can be produced in passing, for example, from a wide band of black into a relatively wide band of white. At practical slow scanning speeds, (i.e. those less than TV rates) the result is that the output signal tends to fluctuate in average level as a function of the large level as a function of the large coarse areas of the information content of the object being scanned, disregarding fine detail. Thus, the signal produced by a photoelectrical transducer in the presence of both coarse and fine optical data is unsuitable for demodulation by otherwise conventional and desirable means, such as a level detector, because the average excursions of the signal exceed the local excursions marking data transitions, and the local excursions caused by black data in a white field, and by the white data in the black field do not equate. The object of my invention is to facilitate the demodulation of video signals of this kind.

Briefly, the above and other objects of my invention are attained by means of a novel circuit including a first channel sensitive to minor amplitude fluctuations caused by local or fine data, but insensitive to amplitude level, a second channel comprising an automatic gain control loop that acts to stabilize the average signal level, and preferably a third relatively wide band channel. The gain control signal may be combined with the high frequency transition signal to produce a reconstituted signal that contains all of the significant data transitions in the original signal without substantial variations in average signal amplitude. Alternatively, and preferably, the signal from the third channel is combined with the high frequency transition signal to produce the reconstituted signal.

The manner in which the apparatus of my invention is constructed, and its mode of operation, will best by understood in the following light of the following detailed description, together with the accompanying drawings, of various embodiments thereof.

Figure 1:
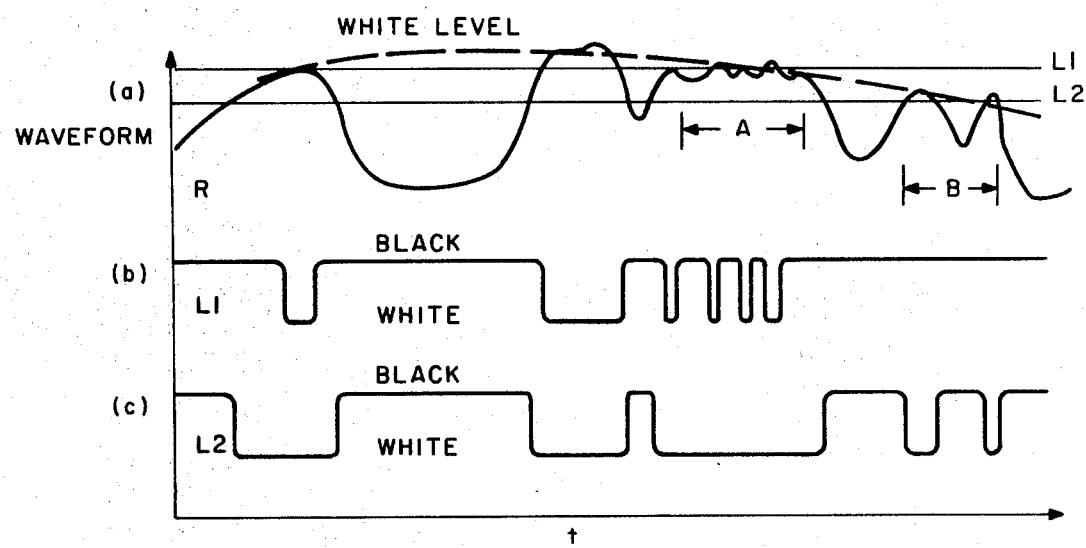
FIG. 1 is a schematic composite graph of waveforms illustrative of one problem presented by a typical video signal.

Referring first to FIG. 1a, I have illustrated a typical waveform obtained from a vidicon tube or the like. The output signal fluctuates above some reference level R, between a maximum value for pure white in the image being scanned by the tube and a minimum value for pure black. As illustrated by the dotted line, the level representing white tends to fluctuate. The result is that if this signal is applied to a level detector set to respond at the level L1 FIG. 1a, the fine data represented by transitions in the region A in FIG. 1a will be properly recorded, as shown in FIG. 1b. However, the fine data in the region marked B, where the white level is decayed, will not be detected. FIG. 1c shows the output signal from a level detector set to respond at level L2 in FIG. 1a. At that setting, the fine data in region A is lost, although the data in region B is detected. Other significant differences in the information represented by the signals shown in FIGS. 1b and 1c will be apparent from inspection. It will be noted that not only is some data absent in each of FIGS. 1b and 1c which is present in the other, but the signals conflict as to the relative size of the black and white regions.

Figure 2:
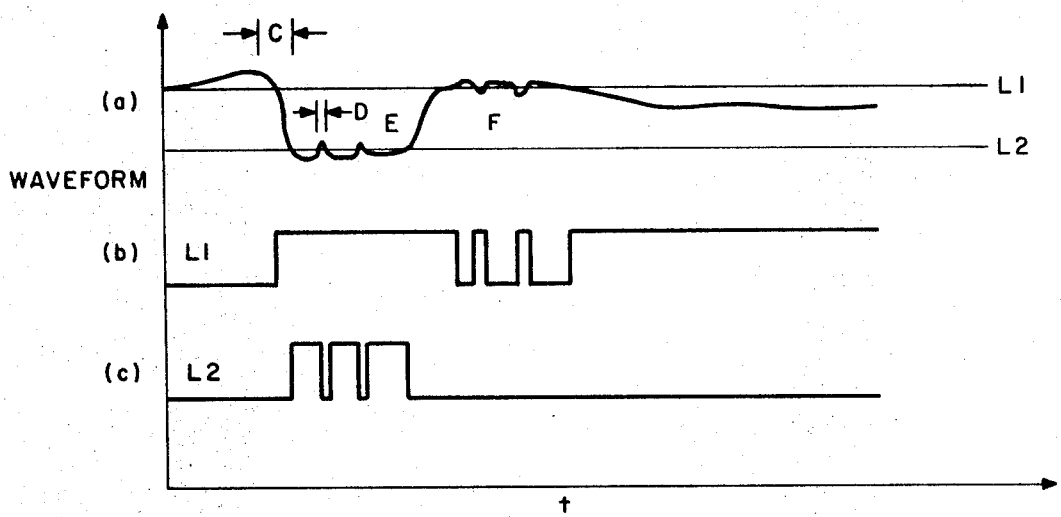
FIG. 2 is a schematic composite graph of waveforms illustrating another problem encountered in dealing with video signals.

FIG. 2 illustrates a second problem that is commonly encountered. FIG. 2a shows another typical video signal. It will be noted that when a change from black to white occurs in the region C of FIG. 2a, in the absence of a closely following transition from black to white, the signal is free to go considerably farther towards the minimum representing total black than it can in the region shown in D in FIG. 2a in which there is a transition from black to white closely followed by a transition from white to black again. In other words, assuming that the transducer exhibits constant rise and fall times, closely spaced transitions will result in pulses of lower amplitude than widely spaced transitions. Thus, the black region in FIG. 2a contains small information pulses, as at E, at widely different amplitude levels from corresponding small transitions F in the white region. As illustrated in FIG. 2b, a level detector set to respond at a level L1 in FIG. 2a will produce the white detail. Similarly, a level detector set to respond at a level L2 in FIG. 2a will produce the fine detail in the black region, as shown in FIG. 2c. However, no level setting can produce both sets of information.

Figure 3:
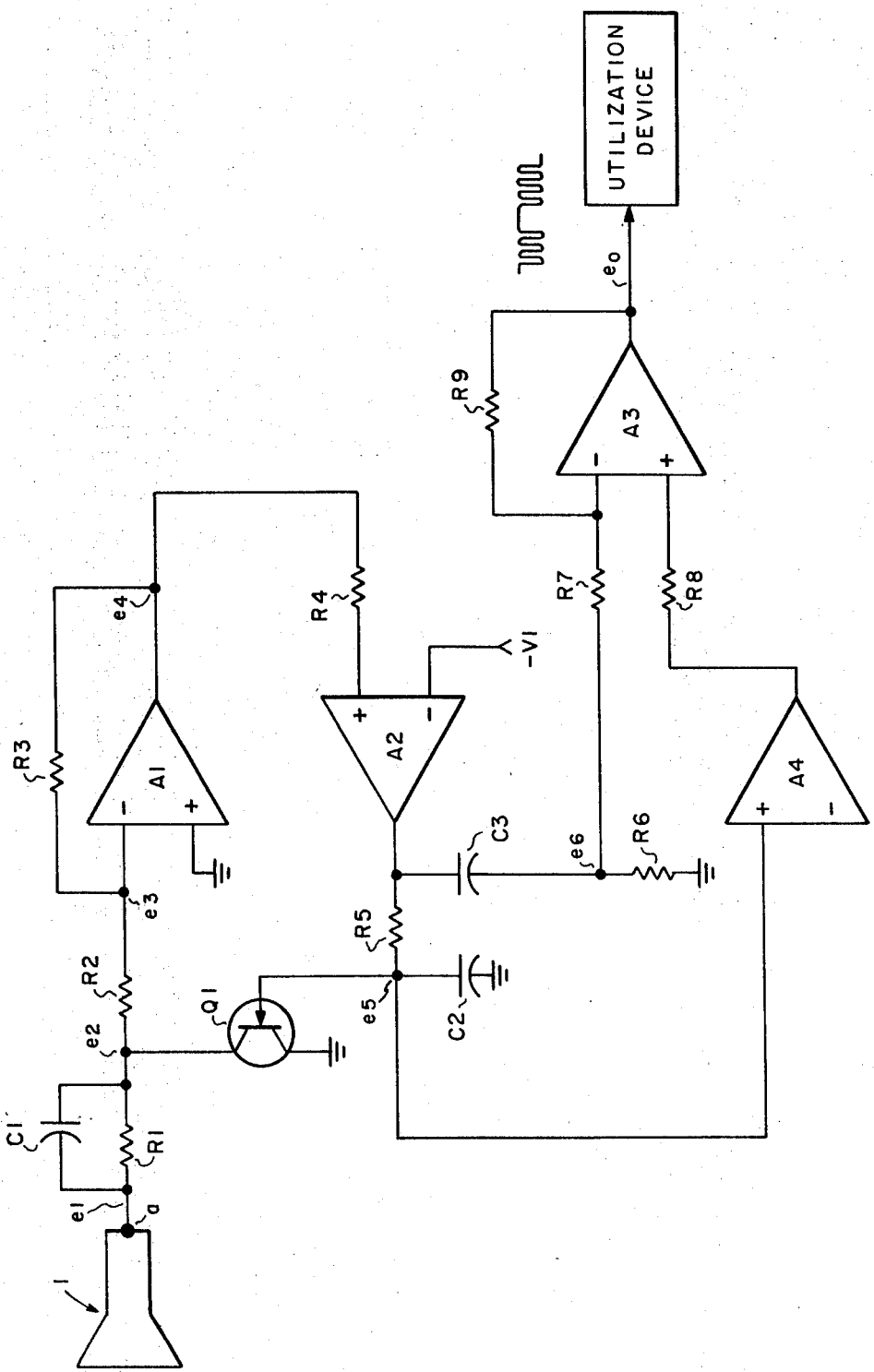
FIG. 3 is a schematic wiring diagram of a first embodiment of my invention.

FIG. 3 shows a first embodiment of my invention for reconstituting video signals such as those shown in FIGS. 1a and 2a to improve the available information content so that it can be recovered by a level detector or other conventional demodulator.

Referring to FIG. 3, I have shown a conventional photoelectrical transducer, which may comprise a vidicon tube, an orthicon tube, an iconoscope, or a flying spot scanner or the like, capable of producing an output signal such as those shown in FIGS. 1a and 2a between an output terminal $a$ and ground. The input signal voltage $e_1$ appearing at this terminal $a$ may be considered to fluctuate between a noise floor near ground potential for black signal, and for example, 0.1 volts positive for a white signal.

The terminal $a$ is returned to ground through a first path comprising a resistor R1 in series with the load terminals of a field effect transistor Q1. A capacitor C1 is connected in parallel with the resistor R1. The upper load terminal of the transistor Q1, at which a potential labeled $e_2$ appears, is connected through a series resistor R2 to the negative (inverting) input terminal of a conventional operational amplifier A1. The positive (noninverting) input terminal of the amplifier A1 is grounded, as shown.

The amplifier A1 is provided with a feedback resistor R3 connected between its output terminal and its negative input terminal. The output terminal of the amplifier A1 is connected to the positive input terminal of a second operational amplifier A2 through a resistor R4. The negative input terminal of the amplifier A2 is connected to a suitable source of reference potential, indicated as $-V_1$. If the resistors R3 and R2 are chosen to produce a 1 volt negative output signal $e_4$ in response to a 0.1 volt positive input signal A2, the voltage V may be $-1$ volt. Thus, the amplifier A2 will produce a zero output signal for a 1 volt signal $e_4$, and an increasingly positive output signal for voltages $e_4$ between $-1$ volt and ground.

A first path to ground from the output terminal of the amplifier A2 extends through a resistor R5 and a capacitor C2 in series. The junction of the capacitor C2 and the resistor R5 is connected over a first path to the gate of the field effect transistor Q1, and over a second path through a conventional amplifier A3 and a resistor R8 to the positive input terminal of a conventional operational amplifier A9.

The field effect transistor Q1 is selected to produce an impedance between its load terminals that increases over a suitable region with increasing positive values of the voltage $e_5$ at the junction of the resistor R5 and the capacitor C2. It will be apparent that a small positive input voltage $e_2$, representing a black signal, will correspond to a relatively large voltage $e_5$. After a delay determined by the time constant R5C2, the voltage $e_5$ will then rise to increase the impedance presented by the load terminals of the transistor Q1 and thus effectively raise the voltage $e_2$ applied to the amplifier A1 to provide a delayed gain-leveling control effect.

A second path extends from the output terminal of the amplifier A2 to ground through a capacitor C3 and a resistor R6. The potential $e_6$ occurring at the junction of the resistor R6 and the capacitor C3 is applied through a resistor R7 to the negative input of the amplifier A4.

The amplifier A4 is provided with a feedback resistor R9 connected between its output terminal and the negative input terminal. The output voltage $e_0$ at the output terminal of the amplifier A4 is supplied to a utilization device, comprising a level detector or the like, and suitable display or recording circuits. For example, the output signal $e_0$ may be applied first to a level detector, and then to facsimile transmission equipment, suitable for transmitting the video signal over a telephone line to a facsimile receiving station. Alternatively, the utilization device may simply comprise a display tube.

As illustrated schematically in FIG. 3, the input voltage $e_1$ may contain information comprising fine data at widely different levels, but the output voltage $e_0$ will contain all of the fine data within a level range that can be readily applied to a level detector.

Having described the construction of the apparatus of this embodiment of my invention, its operation will next be described. First, assume that the resistance $R_q$ of the field effect transistor Q1 is represented as a constant resistance Ro plus a term that increases from zero with increasing positive values $e$ of the voltage $e_5$; i.e., $R_q = R_o k e^2{}_5$, where $R_o$ and $k$ are constants. Considering first the rapid transitions, corresponding to white-black or black-white edge transitions in the copy, the capacitor C1 is so chosen relative to the resistor R1 and the base resistance Ro of the field effect transistor Q1 that for such transitions the capacitor C1 effectively shunts the resistance R1 and the voltage $e_2$ is essentially equal to the voltage $e_1$. Such transitions will simply be amplified by the amplifier A1, and changed in level by the amplifier A2, so that a negative voltage $e_4$ which is rising towards ground appears as a positive voltage at the output terminal of the amplifier A2. For such rapid transitions, the resistor R5 and the capacitor C2 are so chosen that the capacitor C3 appears as a short circuit, and the voltage $e_6$ across the resistor R6 is essentially that of the amplifier A2. The component of the voltage $e_o$ appearing at the output of the amplifier A3 that corresponds to the voltage $e_6$ will simply be the inverse of the voltage $e_6$ multiplied by the ratio R9/R7. From another point of view, the apparatus up to and including the capacitor C3 and the resistor R6 essentially comprises a high pass filter which produces a signal indicating transitions in the input signal $e_1$ without regard to DC level.

Considering next the lower frequency signal level changes described above, such low-speed transitions will see the capacitor C1 as a high impedance relative to the resistor R1, and the capacitor C3 will appear as a high impedance. The capacitor C3 should be chosen to be small with respect to the size of the capacitor C2 for that purpose. Accordingly, the low frequency circuit will be significantly affected by impedance changes in the load path of the transistor Q1.

The impedance presented by the load terminals of the field effect transistor Q1 will vary with the coarse information content of the data being scanned by the vidicon tube 1. That impedance variation correspondingly adjusts the magnitude of the voltage $e_2$ that is applied to the amplifier A1, so that the average level of the output signal $e_0$ is made relatively independent of the coarse data content of the object that is being scanned.

The purpose of the amplifier A4 is simply to provide gain. The field effect transistor Q1 only exhibits the desired impedance response over a narrow range of low frequency voltage signals applied to its gate.

Figure 4:
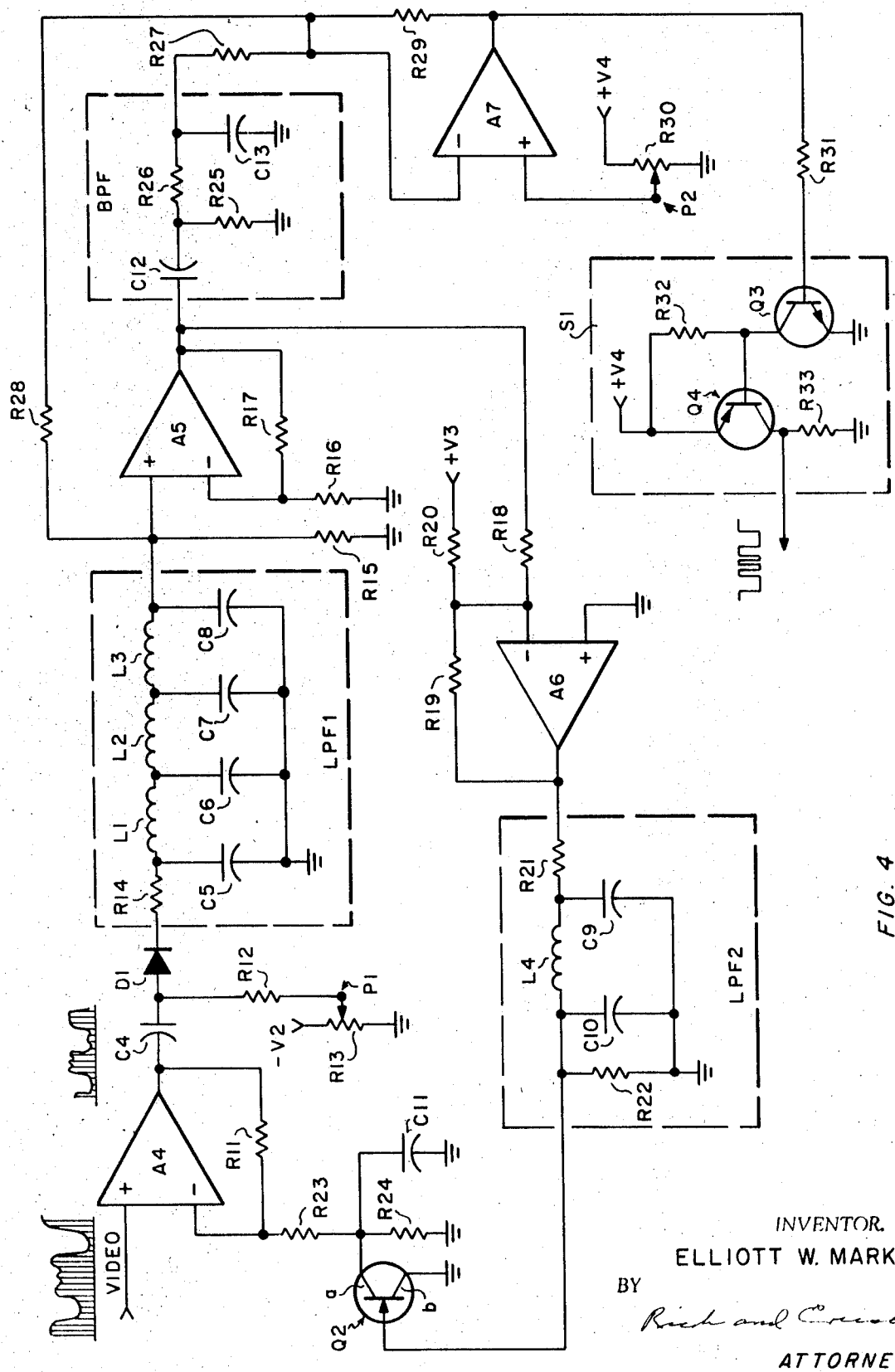
FIG. 4 is a schematic wiring diagram of a presently preferred embodiment of my invention.

FIG. 4 shows a preferred embodiment of my invention particularly adapted for use with a vidicon tube. Such a tube exhibits an output signal amplitude that is dependent on scanning speed; higher amplitude signals are produced by higher scanning speeds. Optimum performance of the vidicon tube is attained at scanning speeds that are too high for facsimile purposes. Thus, it has been found expedient to scan in short rapid increments displaced by time intervals, so that the average scanning rate remains low but the instantaneous scanning rate, and accordingly the output signal amplitude, is high. The result is a chopped waveform, as suggested above the positive input terminal of an operational amplifier A4 is FIG. 4.

The video signal from the scanning tube, corresponding to the input signal at terminal $a$ in FIG. 3, is applied to the positive input terminal of the amplifier A4. The output terminal of the amplifier A4 is connected through a coupling capacitor C4 to a diode D1. The junction of the capacitor C4 and the diode D1 is connected to ground through an offsetting circuit comprising a resistor R12 in series with the wiper of a potentiometer P1. The potentiometer P1 comprises a resistive element R13 connected between ground and a reference potential at $-v2$. The purpose of the offsetting DC potential thus applied to the diode D1 is to clip the input signal above a noise floor that ordinarily accompanies the input signal, so that the signal-to-noise ratio is enhanced.

The signal passed by the diode D1 is applied to a first low pass filter LPF1 comprising an input resistor R14 and a series of $pi$ sections, comprising capacitors C5, C6, C7 and C8 and inductors L1, L2 and L3 connected as shown. This filter preferably has a passband extending from DC up to a relatively sharp cutoff at a frequency determined by the basic scan rate; for example, about 4 kilocycles per second. Its purpose is to discard the chopping frequency described above. If desired, the filter can be omitted, when chopping is not used.

The output signal from the filter LPF1 is applied across an output resistor R15 to the positive input terminal of an operational amplifier A5. The negative input terminal of the amplifier A5 is returned to ground through a resistor R16. There is a feedback path connected between the negative input terminal and the output terminal and comprising a resistor R17.

The output terminal of the amplifier A5 is connected through a resistor R18 to the negative input terminal of an operational amplifier A6. The positive input terminal of the amplifier A6 is grounded. The amplifier A6 is provided with a feedback path comprising a resistor R19. An offsetting potential is produced through a resistor R20 from a positive source of potential +V3. The result is an output signal that fluctuates with departure of the input signal from the value established by the reference potential V3.

The output terminal of the amplifier A6 is connected to a second low pass filter LPF2 through an input resistor R21. The resistor R21 is returned to ground through a capacitor C9, and through an inductor L4 is series with a capacitor C10 in a parallel path to ground. A resistor R22 is connected across the capacitor C10. The output signal from the filter LPF2, appearing across the resistor R22, is applied to the gate of a field effect transistor Q2 that serves essentially the same purpose as the transistor Q1 in FIG. 3. One load terminal of the transistor Q2 is grounded, and the other load terminal is connected through a resistor R23 to the negative input terminal of the amplifier A4. The upper load terminal of the transistor Q2 is returned to ground through a resistor R24 in parallel with a capacitor C11.

Referring again to the amplifier A5, its output terminal is connected to a band-pass filter BPF and the filter BPF comprises a capacitor C12, connected to ground through a resistor R25, and, at the junction of the capacitor C12 and the resistor R25, a resistor R26, connected to ground through a capacitor C13.

The output signal from the band-pass filter BPF, appearing across the capacitor C10, is supplied through a summing resistor R27 to the negative input terminal of an operational amplifier A7. A second signal, corresponding to the input voltage supplied to the amplifier A5, is supplied to the negative input terminal of the amplifier A7 through a summing resistor R28.

The amplifier A7 has a feedback path connected between its output terminal and its negative input terminal and comprising a resistor R29. The positive input terminal of the amplifier A7 is connected to the ground through the wiper of a potentiometer P2 having a resistive element R30 connected between ground and a suitable source of reference potential +V4. The reference potential +V4 produces an offset determined by the extend of adjustment of the potentiometer P2 that adapts the amplifier A7 to apply an appropriate output signal, through a resistor R31, to an electronic switch S1 that serves in effect as a level detector to provide a digital output signal having one value for white signals in the video input and a second valve for black signals.

As shown, the switch S1 comprises an NPN transistor Q3 having a grounded emitter, a base connected to the resistor R31, and a collector returned to the source potential at +V4 through a resistor R32. The collector of the transistor Q3 is connected to the base of a PNP transistor Q4. The latter has its emitter returned to the potential +V4, and its collector returned to ground through a resistor R33. The useful output signal, for video reconstitution purposes, appears across the resistor R33.

The band-pass filter BPF in FIG. 4 is preferably arranged to pass a band between 300 cycles per second and 2 kilocycles per second, for the particular scan rate and data content assumed for this example, with a relatively flat response between those extremes and a relatively sharp cutoff at the upper end. The purpose of the cutoff at higher frequencies is to reduce the effect of noise; essentially all of the useful information in the input signal occurs between 300 and 2000 cycles per second.

The low pass filter LPF2 is arranged to pass frequencies with a relatively flat response up from DC to about 100 cycles per second, and to cut off rather sharply at that frequency. The result is that the filter LPF1 discards the chopping frequency and all fine data, as noted above. The filter BPF passes the rapid transitions in the data, and thus serves much the same purpose as the capacitor C3 and resistor R6 is FIG. 3. The relatively broad spectrum signal appearing across the resistor R15 is supplied through the summing resistor R28 to be added to the output of the filter HPF to provide a reconstituted video signal containing all the input data transitions at relatively constant extremes of level, so that the switch S1 is operated reliably to reproduce the data transitions without regard to average signal level.

The filter LPF2 responds at a considerably lower frequency to adjust the average DC level of the output signal to maintain it relatively constant despite fluctuations caused by changes in the average coarse data content of the copy. It will be apparent that the output signal from the filter LPF2 determines the impedance presented by the load terminals, namely, the drain and source terminals $a$ and $b$, respectively, of the field effect transistor Q2, and thereby determines the gain of the amplifier A4. The range over which the gain of the amplifier A4 can be changed in this way is determined by the resistors R23 and R24 and by the capacitor C11.

The capacitor C11 is selected to be a relatively high impedance relative to the resistor R24 at the low frequencies passed by the filter LPF2, and a relatively low impedance relative to the resistor R24 at the higher frequencies to which the filter BPF responds. Thus, the gain of the amplifier amplifier A4 is relatively constant at higher temperatures, but is variable at low frequencies to maintain the average DC level of the output signal from the amplifier A5 relatively constant. The low frequency gain control effect can be adjusted readily by changing the resistor R24, whereby the circuit can be tailored to the requirements of a particular input signal.

Typical values of the components of the apparatus in FIG. 4 are as given in the following table.

TABLE I

| Component | | Value |
|---|---|---|
| R11 | ohms | 27K |
| R12, R15 | ohms | 2.2K |
| R14, R16, R23 | ohms | 1K |
| R17, R33, R18, R19, R20, R24 | ohms | 10K |
| R21 | ohms | 330 |
| R22 | ohms | 470 |
| R25, R32 | ohms | 4.7K |
| R26, R27, R28 | ohms | 20K |
| R29 | ohms | 470K |
| R31 | ohms | 47K |
| L1, L2, L3 | microhenries | 47 |
| L4 | henries | 0.6 |
| C4 | µf | 0.25 |
| C5, C8 | µf | 0.05 |
| C6, C7, C12 | µf | 0.1 |
| C9, C10 | µf | 3 |
| C11 | µf | 1 |
| C13 | µf | 0.01 |

The potentiometer P1 and P2 are adjusted to produce offset voltage of about −0.3 and +5 volts, respectively.

While I have described by invention with respect to the details of various embodiments thereof, many changes and variations will occur to those skilled in the art upon reading my description, and such obviously can be made without departing from the scope of my invention.

Having thus described my invention, what I claim is:

I claim:

1. A waveshaping circuit for conditioning a signal in which data transitions occur at varying amplitude levels, comprising:
    an adjustable attenuator responsive to a signal to be conditioned to produce an attenuated signal having an amplitude in accordance with the extent of said adjustment,
    first circuit means responsive to said attenuated signal for adjusting said attenuator in accordance with gradual changes in its average amplitude to keep the average amplitude of said attenuated signal relatively constant,
    second circuit means responsive to said attenuated signal for producing a first signal corresponding to rapid transitions in said attenuated signal,
    means responsive to said attenuated signal for producing a second signal corresponding to at least the gradual transitions of said attenuated output signal, and
    summing means responsive to said first and second signals for producing a combined signal in accordance with the sum of said first and second signals.

2. The apparatus of claim 1, further comprising:
    level detecting means responsive to said combined signal for producing an output signal having a first amplitude for each portion of said combined signal below a predetermined amplitude and a second amplitude for each portion of said combined signal above said predetermined amplitude.

3. The apparatus of claim 1, in which said first circuit means comprises:
    a low pass filter and said second circuit means comprises a high pass filter.

4. The apparatus of claim 3, in which said means for producing said second signal comprises:
    circuit means connected between said low pass filter and said summing means.

5. The apparatus of claim 1, in which said first circuit means comprises:
    a low pass filter, and
    said second circuit means comprises a band pass filter for rejecting frequencies above and below the range in which information transitions in the signal to be conditioned occur.

6. The apparatus of claim 5, in which said means for producing said second signal comprises:
wide band circuit means connected between said attenuator and said summing means.

7. The apparatus of claim 6, in which said wide band circuit means comprises:
a low pass filter having a cutoff frequency substantially above the upper cutoff frequency of said band-pass filter.

8. In combination, variable gain amplifying means responsive to a first applied signal for amplifying a second applied signal an amount determined by said first applied signal to produce an amplified signal, a low pass filter means connected to said amplifying means and responsive to said amplified signal to apply a first signal to said amplifying means to vary the gain of said amplifying means and reduce low frequency excursions of said amplified signal,
summing means responsive to two applied signals for producing an output signal in accordance with their sum,
differentiating means responsive to said amplified signal for applying a first signal to said summing means in accordance with high frequency fluctuations in said amplified signal, and
circuit means for applying said amplified signal to said summing means.

9. The apparatus of claim 8, further comprising:
level detecting means controlled by said summing means for producing an output signal having a first or a second amplitude according as the amplitude of said output signal is above or below a predetermined value, respectively.

10. In combination, a variable gain amplifier responsive to an applied input signal to produce an amplified output signal,
a low pass filter having a cutoff at a frequency $f_1$ connected in an automatic gain control loop around said amplifier,
a band-pass filter having a passband between frequencies $f_2$, $f_2 > f_1$, and $f_3$, $f_3 > f_2$, connected to said amplifier for producing an output signal in accordance with the components of the amplifier output signal in said pass band, and
a summing circuit connected to said band-pass filter and said amplifier for producing an output signal in accordance with the sum of their output signals.

11. The apparatus of claim 10, further comprising:
a level detector connected to said summing circuit for producing a signal having a first or a second value according as the output signal from said summing circuit is above or below a predetermined value, respectively.

12. In combination, amplifying means comprising:
an input terminal and an output terminal, said amplifying means further comprising a gain control circuit including a variable impedance adjustable to vary the gain between said input terminal and said output terminal,
a low pass filter connected to said output terminal to produce a first signal corresponding to low frequency components of the output signal of said amplifier produced in response to an applied input signal,
means responsive to said first signal for adjusting said variable impedance to stabilize the average level of the output signal of said amplifier,
an active filter having an input terminal, an output terminal, and a response characteristic insensitive to frequencies passed by said low pass filter,
means connecting the output terminal of said amplifying means to the input terminal of said active filter, and
summing means connected between the output terminal of said amplifying means and the output terminal of said active filter to produce an output signal in accordance with the sum of their output signals.

13. The apparatus of claim 12, further comprising:
level detecting means connected to said summing means to produce a first or a second output signal level according as the output signal from said summing means is below or above a predetermined value, respectively.

14. The apparatus of claim 12, in which said active filter comprises:
an amplifier and a differentiating circuit connected to said amplifier.

15. The apparatus of claim 12, in which said active filter comprises:
a band-pass filter and an amplifier connected to said band-pass filter.

16. The apparatus of claim 12, in which said amplifying means comprises:
an operational amplifier and an attenuator connected between said input terminal and said operational amplifier, said attenuator comprising a potential divider including a fixed impedance connected in series with said variable impedance.

17. The apparatus of claim 16, in which said fixed impedance comprises:
at least one active component and exhibits a high impedance to the frequencies passed by said low pass filter and a low impedance to frequencies passed by said active filter.

18. The apparatus of claim 16, in which said variable impedance comprises:
a field effect transistor.

19. The apparatus of claim 12, in which said amplifying means comprises:
an amplifier and a gain determining impedance network connected to said amplifier, said network including said variable impedance connected in parallel with a fixed impedance, and said fixed impedance comprising a resistor and a capacitor connected in parallel.

20. The apparatus of claim 19, in which said variable impedance comprises:
a field effect transistor.

21. In combination, a variable gain network responsive to a first applied signal to produce an output signal amplified to an extent dependent on a second applied signal,
summing means responsive to a set of applied signals to produce an output signal in accordance with this sum,
differentiating means connected between said network and said summing means to apply a first signal to said summing means,
means for applying the output signal from said network to said summing means,
a low pass filter responsive to the output signal from said network to produce a control signal, and
means for applying said control signal as said second signal to said network.